United States Patent [19]

Skaar et al.

[11] Patent Number: 5,542,593
[45] Date of Patent: Aug. 6, 1996

[54] TAPE GUIDES FOR MAGNETIC TAPE EQUIPMENT

[75] Inventors: Leif Skaar; Kenneth Sheppard; Donald Stanley; Hossein A. Zeinali; Ali Khorsandian; David A. Krula, all of San Diego, Calif.

[73] Assignee: Verbatim Corporation, Charlotte, N.C.

[21] Appl. No.: 240,533

[22] Filed: May 10, 1994

Related U.S. Application Data

[63] Continuation of Ser. No. 18,731, Feb. 17, 1993, abandoned.

[51] Int. Cl.$^6$ .......................... B65H 23/04; B65H 57/04; G03B 1/48; G11B 15/60
[52] U.S. Cl. .................. 226/196; 242/615.3; 242/615.4; 360/130.21
[58] Field of Search .................................... 226/196, 193, 226/190; 242/76, 199, 615.3, 615.4, 615, 397, 397.2, 548, 548.2, 566, 157 R, 377, 326.4, 346, 346.1; 360/132, 130.21, 83, 90, 137

[56] References Cited

U.S. PATENT DOCUMENTS

| | | | |
|---|---|---|---|
| 4,191,345 | 3/1980 | Sato et al. | 226/196 X |
| 4,365,769 | 12/1982 | Shoji | 242/346 |
| 4,638,387 | 1/1987 | Mukasa et al. | 360/122 |
| 4,863,116 | 9/1989 | Iizuka et al. | 242/346.2 |
| 5,034,839 | 7/1991 | Okamura et al. | 360/132 |

OTHER PUBLICATIONS

Compilation of alloys by compositions; published 1985, Standards Handbook.
American National Standard, Engineering Drawing and Related Documentation Practices; 1978 (reaffirmed in 1993).
E. Oberg, et al., "Machinery's Handbook", Twentieth Edition, 1975, p. 2387.

*Primary Examiner*—John Q. Nguyen
*Attorney, Agent, or Firm*—Albert C. Smith

[57] ABSTRACT

A tape guide for operation in contact with the back side of magnetic tape exhibits an increase in the coefficient of friction between the tape guide and the tape with increased wear of the guide surface associated with repeated passes of tape in sliding engagement over the tape contacting surface of the guide. The resulting increased frictional drag on magnetic tape with wear of the tape guide improves overall performance by reducing instantaneous speed variations (ISV) in the tape attributable to translational vibrations in the tape over the life of the tape and tape guide. The tape contacting surface of the tape guide includes a metal alloy including copper zinc, nickel and lead that may be integrally incorporated into the tape guide or plated thereon at least in the tape contacting region thereof.

12 Claims, 2 Drawing Sheets

TAPE GUIDES FOR MAGNETIC TAPE EQUIPMENT

RELATED APPLICATIONS

This is a continuation of application Ser. No. 08/018,731 filed on Feb. 17, 1993, abandoned.

FIELD OF THE INVENTION

This invention relates to magnetic tape equipment, and more particularly to improved tape guides and materials for reducing the signal recording and reproduction effects of longitudinal vibrations in magnetic tape.

BACKGROUND OF THE INVENTION

Magnetic tape systems commonly exhibit instantaneous speed variations (ISV) that are distributed in the frequency spectrum from low frequencies that are mostly excited mechanically to high frequency ISV events that are due to tape phenomena. Certain tape drives and associated tape transducers have a sensitivity to ISV that occur in the 7 KHz to 10 KHz range. For certain tape drive units and associated transducer circuitry operating on ¼-inch wide tape running at about 34 Inches Per Second (IPS), such sensitivity to ISV is attributable, in part, to the coherent longitudinal wave which is generated in the tape that affects the relative position of a recorded signal, and that translates to a time-related and positionally-oriented error which, in turn, affects the accuracy with which the transducer circuitry can record and reproduce signals.

One mechanically resonant system that is responsible for ISV includes a length of tape under tension that passes from one tangent point on a tape reel to another tangent point on another tape reel, with the excitation force being created by the unwinding or peeling of the tape layers at a rate determined by the longitudinal velocity of the tape. Specifically, this excitation is attributable to an interaction of the magnetic coat and back coat of the tape, and to the friction interaction of those surfaces as the tape unwinds. One scheme to reduce this mode of ISV simply lengthens the tape path to reduce the characteristic frequency of the ISV events. However, because of packaging constraints, particularly in tape cartridges, the scheme of lengthening the tape path is not practical.

Another scheme to reduce this mode of ISV modifies the back coat or the magnetic coat of the tape in order to reduce the excitation forces due to friction. However, reducing the frictional interaction of the magnetic coat and back coat can have adverse effects on tape windability and the orderly packing of tape on a reel.

SUMMARY OF THE INVENTION

In accordance with this invention, different guide materials or coatings (applied by dipping, plating, sputtering, or evaporation) are used to control the frictional properties of the interaction of tape on tape guides to dampen out critical coherent longitudinal waves along the tape. In accordance with the present invention, friction of the tape on the tape guides is increased to lower the 'Q' of the resonant system. This reduces ISV events to sufficiently low levels that errors in detection of data signals on the tape are substantially eliminated. This form of damping is most effective when the tape is traveling at relatively low speeds when no significant air bearing is established between the tape and the guides since ISV-induced error events are typically not seen as problems in cartridges operating at 68 IPS or greater. However, by increasing the friction of the system, slightly more energy is dissipated in the cartridge, and an increase in Tangential Drive Force (TDF) is required. In accordance with the present invention, selected tape guide materials increase the TDF only very slightly for the amount of damping required.

DESCRIPTION OF THE PREFERRED EMBODIMENT

Figure 1:
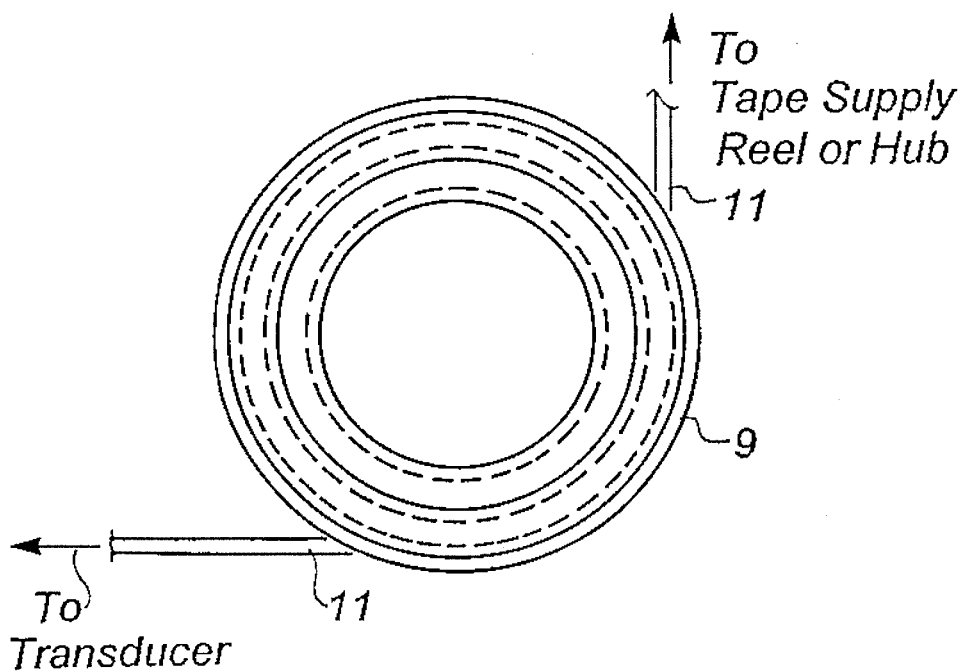
FIG. 1 is a top view of a tape guide according to the present invention.
Figure 2:
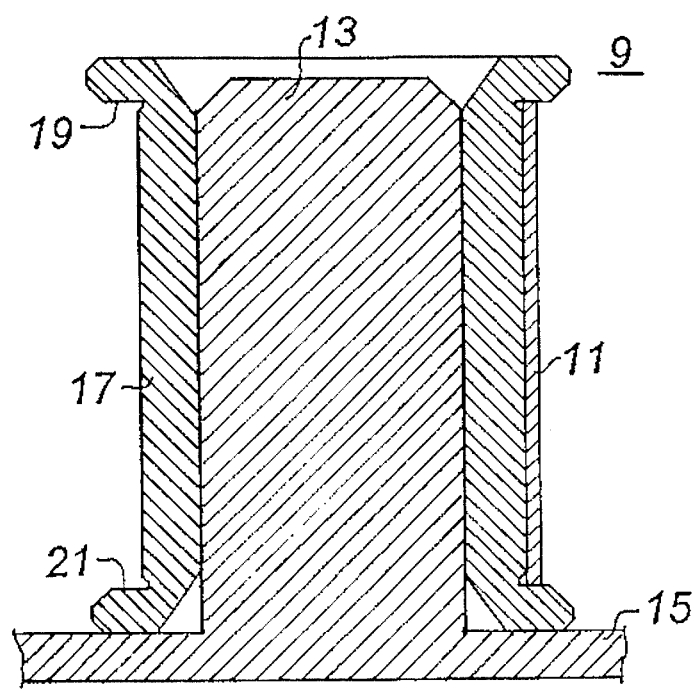
FIG. 2 is a sectional view of the tape guide of FIG. 1 positioned on a supporting post and baseplate.
Figure 3:
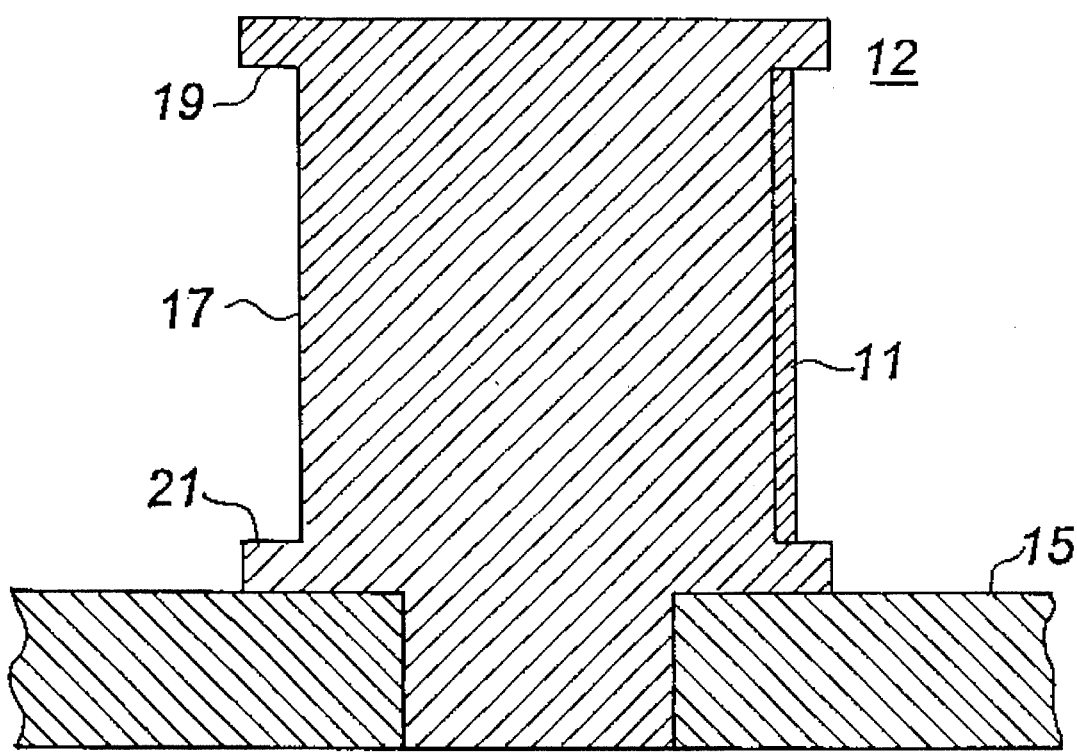
FIG. 3 is a sectional view of another tape guide formed for insertion into baseplate.

Referring now to FIG. 1, there is shown a top view of tape guide 9 that is positioned along a path for movement of tape 11 between a supply of tape and a tape transducer (not shown). Of course, the wrap angle of contact of the tape 11 with the surface of the guide 9 may vary as a supply reel or hub of tape varies in diameter. As illustrated in the sectional view of FIG. 2, the guide 9 is a generally tubular, cylindrical member that is rigidly attached to a supporting post 13 by such conventional means a press fitting, adhesive attachment, thermoplastic welding, and the like, to retain the guide 9 against rotation and at the proper elevation relative to a base plate 15. Similarly, as illustrated in the sectional view of FIG. 3, the guide 12 is generally of solid cylindrical shape with an integral post that is inserted into an aperture in baseplate 15. The tape 11 therefore slides over the recessed surface 17 of the guide, with the upper and lower borders of the tape 11 properly positioned by the upper and lower shoulders or flanges 19 and 21 that define the limits of the tape-contacting surface 17 of the guide 9, 12. The tape 11 commonly includes magnetic material disposed on one side of a strip or web of flexible plastic material such as Mylar, and includes a back side that is commonly smooth and optionally coated with a carbon composition. Magnetic recording tape of this type is conventional and may be specified as NT-6 type recording tape. Frictional engagement of the back side of the tape 11 with the recessed surface 17 of the guide introduces an opposing force against the movement of tape around the guide, which opposing force is determined by the coefficient of friction between the contacting surfaces of the tape and guide, by the angle of wrap of tape about the surface 17, by the tension in the tape, and by the speed at which the tape 11 moves past the guide 9, 12. It is believed that the opposing frictional force reduces at higher tape speeds due to a film of air that is entrained between the tape 11 and guide 9, 12. Of course, the increased friction is overcome by the tape drive of conventional design (not shown) that moves tape 11 past one or more tape guides 9, 12 and a tape transducers along a path between tape take-up and supply reels or hubs.

In accordance with one embodiment of the present invention, frictional interaction is selectively increased between the back of a length of tape and the associated tape guides that are disposed at selected positions along a tape path. The increased friction lowers the 'Q' of the longitudinally resonant tape system and reduces the effects of ISV to tolerable limits. The back of conventional tape, typically smooth Mylar plastic material that may be carbon coated, does not have to be altered according to the present invention. Instead, the material that forms a tape guide (or a coating on the guide surface) disposed along the path of tape movement is selected to increase coefficient of friction with wear attributable to multiple passes of the tape over the tape guide.

In accordance with the preferred embodiment of the present invention, tape guides are disposed on opposite sides of a tape transducer along the tape path and are formed of a metal alloy including about 61.5% copper, about 25.5% zinc, about 12% nickel, and about 1% lead. This alloy, commonly referred to as 'nickel-silver', contains no silver but is designated as a commercially-available alloy UNS #C-79200. Tape guides thus formed according to the preferred embodiment of the present invention rely upon materials that increase the friction with wear (such as, for example, also commercially available alloy UNS #C-79800 including about 48.5% copper, 39% zinc, 11% nickel, and 2.8% lead), and operate with reduced noise performance on conventional carbon back coated magnetic tape of the type which is commercially designated as NT-6 type tape.

Comparative tests were performed on such magnetic tape operating with the carbon coated back side in contact with a tape guide of conventional stainless steel construction (virgin and worn), and in contact with a tape guide of the preferred alloy described above (virgin and worn), and the results are tabulated in Table 1, below. "Virgin" tape guides represent parts which have not been exposed to environmental conditions, "worn" tape guides represent parts which have been exposed to environmental conditions ranging from –40° C. to +45° C., and relative humidity in the range from about 20% to 80%, and numerous operational passes of tape over the guide. These tabulated figures represent Static Coefficient Of Friction (SCOF), Dynamic Coefficient Of Friction (DCOF), and the average or percent standard deviation in noise of the frictional measurement, where standard deviation is calculated as the deviation in test readings in a dynamic segment of the readings divided by the average readings in the same segment.

TABLE 1

| test guide | SCOF | | DCOF | | Noise |
|---|---|---|---|---|---|
| (material) | avg. | std. | avg. | std. | avg. |
| virgin stainless steel | 0.37 | 0.01 | 0.34 | 0.02 | 2.35 |
| worn stainless steel | 0.31 | 0.02 | 0.31 | 0.02 | 1.82 |
| virgin alloy (uns # C-79200) | 0.40 | 0.02 | 0.40 | 0.01 | 2.01 |
| worn alloy (uns # C-79200) | 0.45 | 0.03 | 0.43 | 0.02 | 1.61 |

It should be noted that the test results tabulated in Table 1 were achieved on a length of about 8 inches of NT-6 type magnetic tape moving back and forth across the test guide at speeds within the range from about 5 inches to about 20 inches per minute and at a surface force against the test guide of about 50 grams. Data on "worn" tape guide represents the data after about 15,000 passes. The initial surface finish on the test guides is specified as $$\sqrt[2]{\frac{16}{.030}},$$

to designate in conventional nomenclature and terminology, the surface texture characteristics in accordance with the American National Standard published information on Surface Texture Symbols.

It should also be noted that the static and dynamic coefficients of friction between the tape and the alloy guide prepared according to the present invention increased with wear, while the corresponding data for the stainless steel guide decreased with wear. The increased tape friction significantly damps the longitudinal vibrations in the tape and promotes the improved performance by decreasing the average noise with wear for the alloy guide of the present invention. In contrast, the average noise increased with wear for the stainless steel guide.

Accordingly, improved performance in a tape transport system is achieved using tape guides of selected alloy material which increases the coefficient of friction against the back of magnetic tape with wear from repeated passes, and decreases the associated noise with wear from repeated passes.

What is claimed is:

1. A tape guide for operation with magnetic tape, the tape guide comprising:

a tape contacting surface disposed intermediate first and second spaced shoulders for registering lateral position of the magnetic tape on the tape contacting surface as magnetic tape slides over said tape contacting surface, said tape contacting surface consisting of a homogeneous metal alloy which includes about 61.5% copper, about 25.5% zinc, about 12% nickel, and about 1% lead.

2. A tape guide for operation with magnetic tape having carbon coating on the side thereof in contact with a tape contacting surface of the tape guide, the tape guide comprising:

a tape contacting surface disposed intermediate first and second spaced shoulders for registering lateral position of the magnetic tape on the tape contacting surface as magnetic tape slides over said tape contacting surface, said tape contacting surface consisting of a homogeneous metal alloy which includes about 61.5% copper, about 25.5% zinc, about 12% nickel, and about 1% lead.

3. A tape guide for operation with magnetic tape, the tape guide comprising:

a tape contacting surface disposed intermediate first and second spaced shoulders for registering lateral position of the magnetic tape on the tape contacting surface as magnetic tape slides over said tape contacting surface, said tape contacting surface including of a homogeneous metal alloy which includes about 48.5% copper, about 36.5% zinc, about 11% nickel, and about 2.5% lead.

4. A tape guide for operation with magnetic tape having carbon coating on the side thereof in contact with a tape contacting surface of the tape guide, the tape guide comprising:

a tape contacting surface disposed intermediate first and second spaced shoulders for registering lateral position of the magnetic tape on the tape contacting surface as magnetic tape slides over said tape contacting surface, said tape contacting surface including of a homogeneous metal alloy which includes about 48.5% copper, about 36.5% zinc, about 11% nickel, and about 2.5% lead.

5. A tape guide for operation with magnetic tape, the tape guide comprising:

a tape contacting surface disposed intermediate first and second spaced shoulders for registering lateral position of the magnetic tape on the tape contacting surface as magnetic tape slides over said tape contacting surface, said tape contacting surface consisting of a homogeneous metal alloy including copper in the range from about 59% to about 66.5% and nickel in the range from about 11% to about 13% and lead in the range from about 0.8% to about 1.4% and zinc as the remainder in the range from about 29% to about 19%.

6. The tape guide according to claim 5 wherein the initial surface finish of the tape contacting surface is specified to be about $$\sqrt[16]{.030}\ .$$

7. The tape guide according to claim 5 for operation with magnetic tape having carbon coating on the side thereof in contact with the tape contacting surface of the tape guide, said tape contacting surface providing a coefficient of friction between the magnetic tape with said carbon coating thereon and the tape contacting surface that increases with wear of the tape contacting surface associated with repeated passes of magnetic tape over said surface.

8. The tape guide according to claim 5 wherein said tape contacting surface is substantially cylindrical having a longitudinal axis extending substantially perpendicularly to the direction of tape movement and the first and second spaced shoulders include radially outward extensions from the cylindrical tape contacting surface, said tape guide being positionable along a path of movement of a length of magnetic tape for contact therewith over a selected wrap angle greater than zero about the cylindrical tape contacting surface.

9. A tape guide for operation with magnetic tape, the tape guide comprising:

a tape contacting surface disposed intermediate first and second spaced shoulders for registering lateral position of the magnetic tape on the tape contacting surface as magnetic tape slides over said tape contacting surface, said tape contacting surface consisting of a homogeneous metal alloy including copper in the range from about 45.5% to about 48.5% and nickel in the range from about 9% to about 11% and lead in the range from about 1.5% to about 2.5% and zinc in the range from about 42.5% to about 35.5%.

10. The tape guide according to claim 9 wherein said tape contacting surface is substantially cylindrical having a longitudinal axis extending substantially perpendicularly to the direction of tape movement, and the first and second spaced shoulders include laterally outward extensions from the cylindrical tape contacting surface, said tape guide being positionable along a path of movement of a length of magnetic tape for contact therewith over a selected wrap angle about the cylindrical tape contacting surface.

11. The tape guide according to claim 9 wherein the initial surface finish of the tape contacting surface is specified to be about $$\sqrt[16]{.030}\ .$$

12. The tape guide according to claim 9 for operation with magnetic tape having carbon coating on the side thereof in contact with the tape contacting surface of the tape guide for establishing a coefficient of friction between the magnetic tape and the tape contacting surface that increases with wear of the tape contacting surface associated with repeated passes of magnetic tape over said surface.

* * * * *